UNITED STATES PATENT OFFICE.

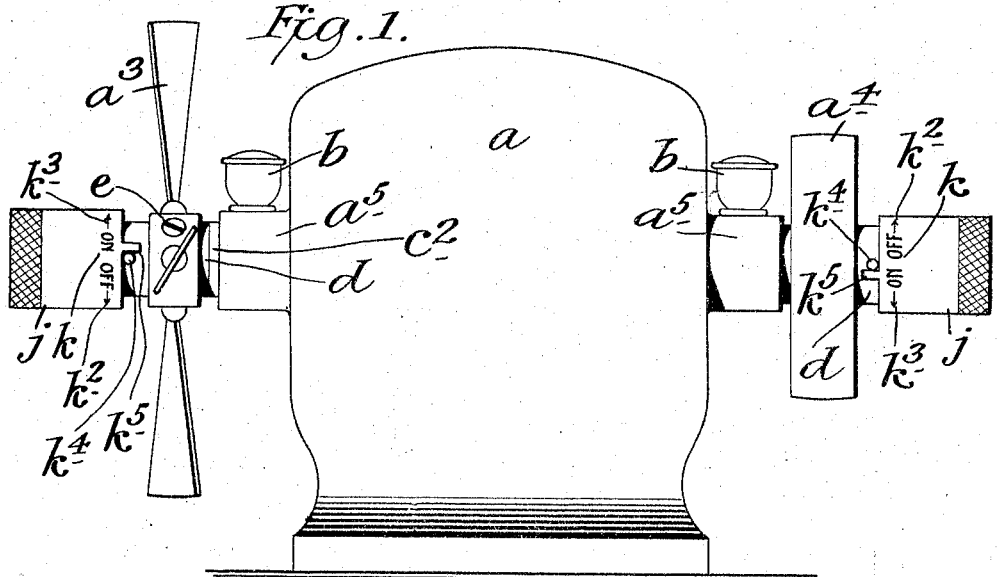
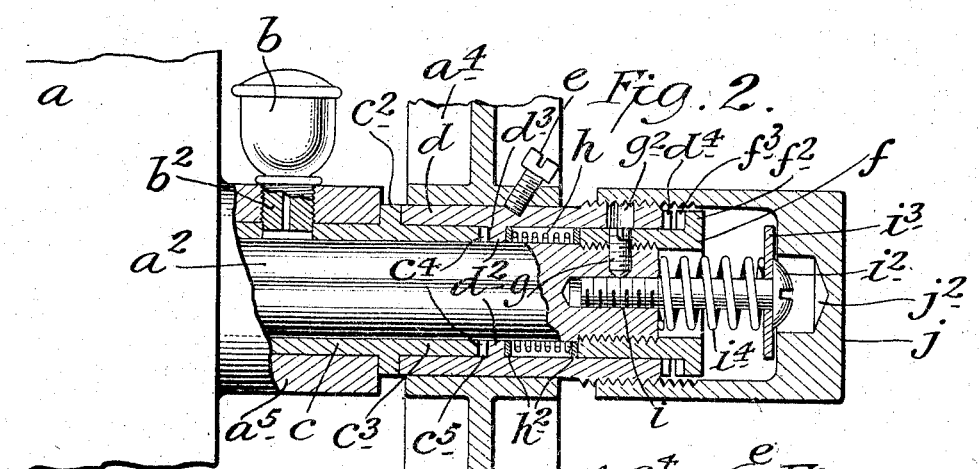
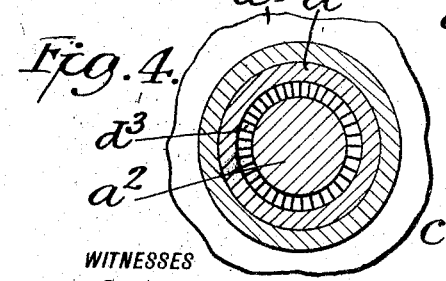
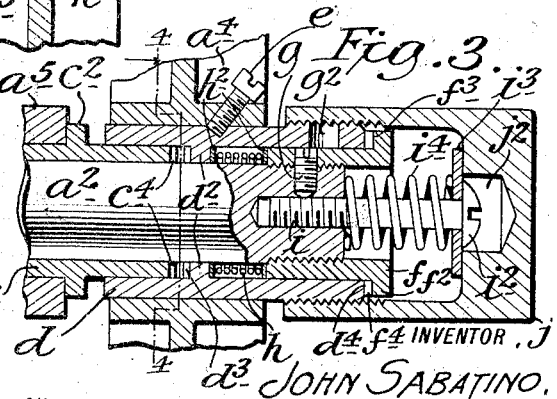
J. SABATINO.
CLUTCH MECHANISM FOR MOTOR SHAFTS.
APPLICATION FILED SEPT. 23, 1911.
1,020,223.
Patented Mar. 12, 1912.
INVENTOR
JOHN SABATINO.

JOHN SABATINO, OF RICHMOND HILL, NEW YORK, ASSIGNOR OF ONE-HALF TO JESSE WALDRON, OF MORRIS PARK, NEW YORK.

CLUTCH MECHANISM FOR MOTOR-SHAFTS.

1,020,223.  Specification of Letters Patent.  Patented Mar. 12, 1912.

Application filed September 23, 1911. Serial No. 650,870.

*To all whom it may concern:*

Be it known that I, JOHN SABATINO, a subject of the King of Italy, and residing at Richmond Hill, in the county of Queens and State of New York, have invented certain new and useful Improvements in Clutch Mechanisms for Motor-Shafts, of which the following is a specification, such as will enable those skilled in the art to which it appertains to make and use the same.

This invention relates to clutch mechanisms or devices for the shafts of motors, and the object thereof is to provide a mechanism of this class which may be applied to either or both ends of the shaft of a motor and by means of which either or both ends of said shaft may be utilized for different purposes at will, as, for instance, in driving a fan or a power wheel for transmitting the motion of said shaft to any kind or class of machinery; a further object being to provide a mechanism of the class and for the purpose specified which may be quickly and easily thrown into and out of operation by the hand; and with these and other objects in view the invention consists in a device or apparatus of the class specified, constructed and operating as hereinafter described and claimed.

The invention is fully disclosed in the following specification, of which the accompanying drawing forms a part, in which the separate parts of my improvement are designated by suitable reference characters in each of the views, and in which:

Figure 1 is a side view of a motor having a shaft, both ends of which are exposed and provided with my improved clutch mechanism; Fig. 2 a sectional side view of one end portion of the shaft and the clutch mechanism mounted thereon and showing a part of the motor, the clutch mechanism being shown in inoperative position; Fig. 3 a view similar to Fig. 2, but showing only the clutch mechanism, and showing it in operative position, and; Fig. 4 a section on the line 4—4 of Fig. 3.

In the drawing forming part of this specification I have shown at $a$ a motor of any kind or class, and said motor is provided with a power shaft $a^2$, both ends of which project therefrom and, in the form of construction shown, a fan $a^3$ is mounted on one end of said shaft and a power or belt wheel $a^4$ on the other.

The opposite sides of the motor casing are provided with bearings $a^5$ having oil cups $b$, and keyed thereto by screw threaded stems $b^2$ with which the oil cups $b$ are provided are tubular bearings or sleeves $c$ having annular ribs $c^2$ which abut against the bearings $a^5$, and said tubular bearings $c$ are also provided with projecting bearings $c^3$ on which are mounted sleeves $d$ on which the fan $a^3$ and the power wheel $a^4$ are respectively mounted, in the form of construction shown, and said fan and power wheel are keyed to the sleeves $d$ by means of set screws $e$.

The sleeves $d$ are movable longitudinally of the shaft $a^2$ and are provided with internal annular ribs $d^2$ the inner faces of which are provided with clutch teeth $d^3$, and the outer ends of the bearings $c^3$ of the tubular bearings $c$ are provided with corresponding clutch teeth $c^4$, in the form of construction shown, but the clutch teeth $c^4$ are not absolutely essential and other clutch devices adapted to operate in connection with the clutch teeth $d^3$ may be employed.

In Fig. 2 the clutch teeth $d^3$ and $c^4$ are shown in engagement at $c^5$ and in Fig. 3 these clutch teeth are shown out of engagement.

Screwed onto the outer ends of the shaft $a^2$ are supplemental sleeves $f$ provided at their outer ends with outwardly directed flanges $f^2$ on the inner sides of which are clutch teeth $f^3$, and the outer ends of the sleeves $d$ are provided with corresponding clutch teeth $d^4$, and in Fig. 2 the clutch teeth $f^3$ and $d^4$ are shown out of engagement, while in Fig. 3 said clutch teeth are shown in engagement at $f^4$. The supplemental sleeves $f$ are keyed to the shaft $a$ by set screws $g$ over which the sleeves $d$ are movable and said sleeves $d$ are provided with apertures $g^2$ through which said set screws are passed.

Placed between the sleeves $d$ and supplemental sleeves $f$ are spiral springs $h$ at the opposite ends of which are preferably placed washers $h^2$, and in the ends of the shaft $a^2$ are screws $i$ which project therefrom and are provided with heads $i^2$, and mounted on said screws are washers $i^3$ which are movable thereon, and between said washers and the ends of the shaft $a^2$ are placed spiral springs $i^4$ which are stronger than the springs $h$, and screwed onto the ends of the sleeves $d$ are caps $j$ having sockets $j^2$ adapted to receive the heads of the screws $i$, and said caps inclose said screws, the washers $i^3$ and the springs $i^4$, together with the outer ends of the sleeves $f$, and said caps are adapted to bear on the washers $i^3$.

When the parts are in the position shown in Fig. 2 the clutch teeth $f^3$ and $d^4$ are out of engagement and the sleeves $d$ will not turn, and the fan $a^3$ and power wheel $a^4$ will be out of operation, as will be readily understood. When it is desired to throw said parts into operation the caps $j$ are screwed inwardly so as to throw the clutch teeth $f^3$ and $d^4$ into operation as shown in Fig. 3, and in this position of the parts, the sleeves $d$ will be turned by the shaft $a^2$ as will also the fan $a^3$ and the power wheel $a^4$.

The caps $j$ are both provided with the words "On" and "Off" as shown in Fig. 1 at $k$ and on the opposite sides of which are placed arrows $k^2$ and $k^3$ which indicate, respectively, the direction in which said caps are to be turned to throw the clutch mechanism out of operation or into operation, and the sleeves $d$ are provided with stop pins $k^4$ and the caps $j$ with fingers $k^5$ which operate in connection with said stop pins and which limit the movement of the caps $j$ in one direction, and said sleeves may also be provided with marks to indicate the proper limit of the movement of said caps in the opposite direction.

The threads between the caps $j$ and the sleeves $d$ are left threads and it will be understood that, with the parts in the position shown in Fig. 2, when the caps $j$ are turned to the left the washers $i^3$ are forced inwardly and the sleeves $d$ are drawn outwardly against the operation of the springs $i^4$ and when said caps are turned to the left, the washers $i^3$ are relieved of pressure and the springs $h$ force the sleeves $d$ inwardly.

It will be understood that the screw $i^2$ may be screwed into the shaft $a$ or out of it so as to regulate the tension of the spring $i^4$, and the screw $i^2$, the washer $i^3$ and the spring $i^4$ serve to take up all the loose action and to prevent the mechanism from rattling when in use, and an operator when accustomed to the manipulation of the machine may determine by the cap $j$ striking the washer $i^3$ when turned in one direction how far said cap should be turned in order to operate the parts as hereinbefore described.

From the foregoing description it will be seen that the clutch teeth $d^3$ and $c^4$ are intended to hold the operative member at one end of the shaft stationary, while the operative member at the other end of the shaft is in use, when it is desired to use only one of said operative members, but these clutch teeth are not an absolute essential feature of my invention and may or may not be employed. It will also be understood that the mechanism at both ends of the shaft $a^2$ is exactly the same, and for this reason only, the mechanism connected with one end of said shaft is shown in section.

My improved clutch mechanism is well adapted for the object for which it is intended, and changes in and modifications of the construction herein described may be made, within the scope of the appended claims, without departing from the spirit of my invention or sacrificing its advantages.

Having fully described my invention, what I claim as new and desire to secure by Letters Patent, is:—

1. A clutch mechanism for the ends of a motor shaft, said mechanism consisting of main stationary sleeves, supplemental sleeves screwed onto the ends of the shaft and provided with set screw keys, said supplemental sleeves being provided at their outer ends with outwardly directed flanges having inwardly directed clutch teeth, sliding sleeves mounted on said first-named sleeves and movable longitudinally thereon and provided between said sleeves with inwardly directed annular ribs having on their inner sides clutch teeth adapted to engage clutch devices on the outer ends of the main sleeves, said sliding sleeves being also provided on their outer ends with clutch teeth adapted to engage the teeth on the flanges of the supplemental sleeves, and said sliding sleeves being also provided with apertures through which the set screw keys of the supplemental sleeves are passed, and a cap screwed onto the outer ends of the sliding sleeves and inclosing the end of the shaft and the supplemental sleeve.

2. A clutch mechanism for the ends of a motor shaft comprising main stationary sleeves, supplemental sleeves screwed onto the ends of said shaft, sliding sleeves mounted on the main and supplemental sleeves, said main and sliding sleeves being provided with clutch devices and said sliding and supplemental sleeves being provided with clutch devices, means for keying the supplemental sleeves to the shaft and adapted to be operated through the sliding sleeves, spiral springs operating on the sliding sleeves and the inner ends of the supplemental sleeves, screws inserted into the ends of the shaft, spiral springs and washers mounted on said screws, and caps screwed onto the sliding sleeves and inclosing the ends of the shaft and the supplemental sleeves and adapted to operate in connection with the washers or the screws.

3. In a clutch mechanism for power shafts, a stationary sleeve, a supplemental sleeve screwed onto the end of the shaft, a sliding sleeve mounted on the adjacent end portions of the main supplemental sleeve, said sliding sleeve and said main sleeve being provided with interoperative clutch devices, and said supplemental sleeve and said sliding sleeve being provided with inter-operative clutch devices, said supplemental sleeve being also provided with a set screw which is passed through an aperture in the sliding sleeve, a spiral spring placed at the inner end of the supplemental sleeve and operating to force the sliding sleeve inwardly, and a cap screwed onto the sliding sleeve and inclosing the end of the shaft and the supplemental sleeve.

4. In a clutch mechanism for power shafts, a stationary sleeve, a supplemental sleeve screwed onto the end of the shaft, a sliding sleeve mounted on the adjacent end portions of the main supplemental sleeve, said sliding sleeve and said main sleeve being provided with inter-operative clutch devices, and said supplemental sleeve and said sliding sleeve being provided with inter-operative clutch devices, said supplemental sleeve being also provided with a set screw which is passed through an aperture in the sliding sleeve, a spiral spring placed at the inner end of the supplemental sleeve and operating to force the sliding sleeve inwardly, and a cap screwed onto the sliding sleeve and inclosing the end of the shaft and the supplemental sleeve, said end of the shaft being also provided with a screw on which is mounted a spiral spring, and a washer in connection with which said cap operates.

5. The combination with the end of a power shaft of a clutch sleeve movable longitudinally thereon, a cap screwed onto said sleeve, and means whereby the turning of said cap in one direction will lock said sleeve to said shaft, and in the opposite direction will release said sleeve.

In testimony that I claim the foregoing as my invention I have signed my name in presence of the subscribing witnesses this 17th day of September 1911.

JOHN SABATINO.

Witnesses:
C. E. MULREANY,
FRANK G. AT I-